Jan. 8, 1952      E. M. RAYBURN      2,581,498
VARIABLE SPEED TRANSMISSION
Filed June 11, 1946      4 Sheets-Sheet 1
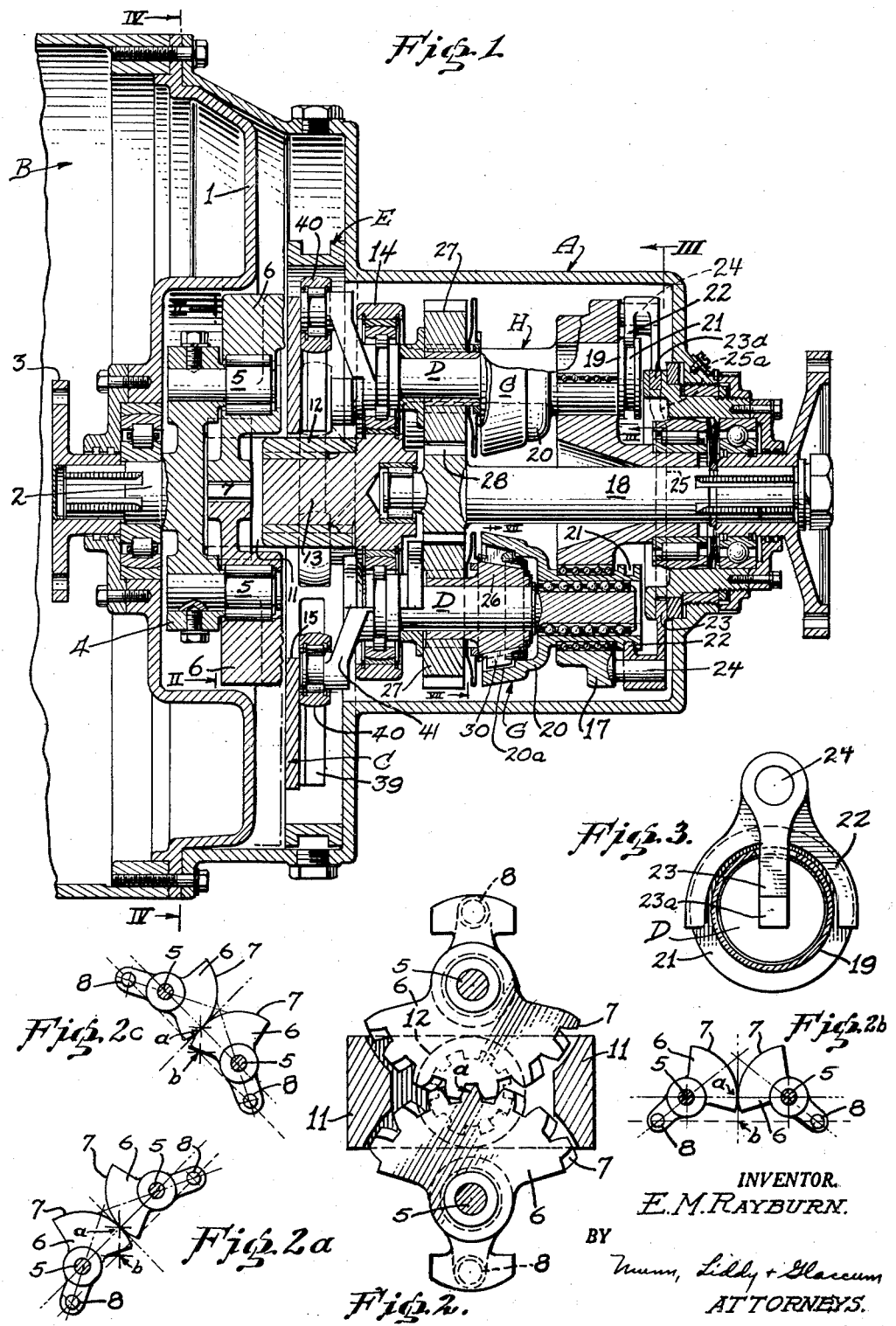
INVENTOR.
E. M. RAYBURN.
BY
Munn, Liddy & Glaccum
ATTORNEYS.

Jan. 8, 1952          E. M. RAYBURN          2,581,498
VARIABLE SPEED TRANSMISSION
Filed June 11, 1946          4 Sheets-Sheet 2
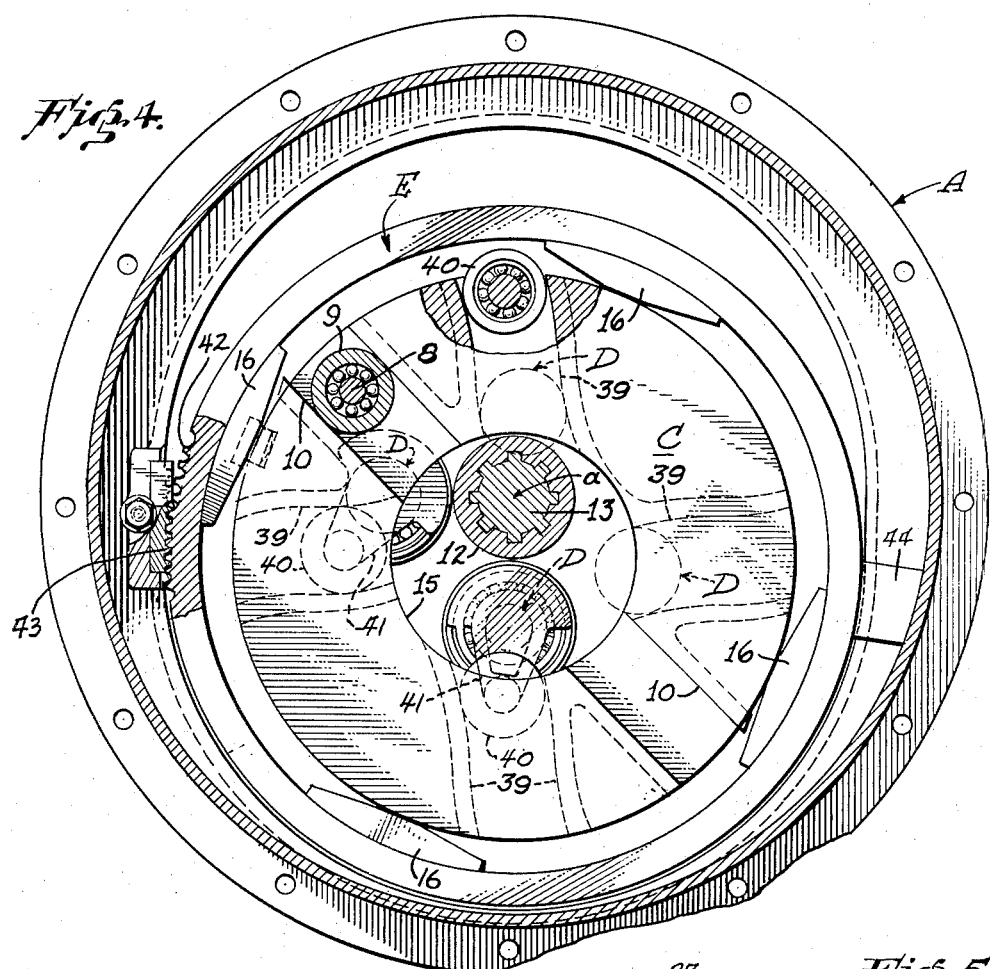
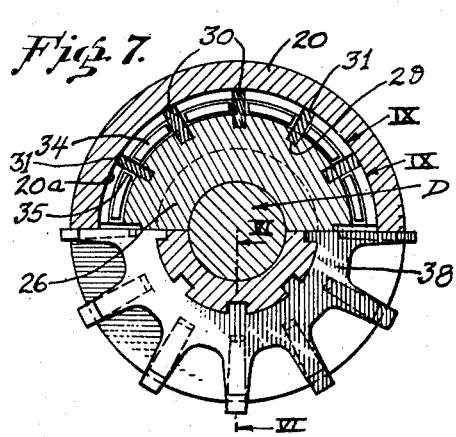
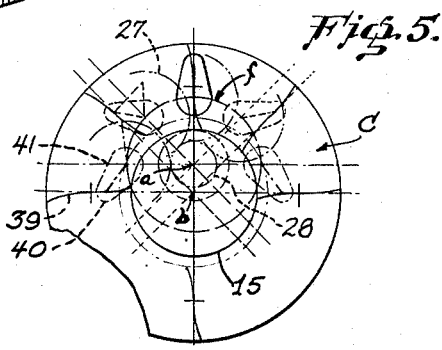
INVENTOR.
E. M. RAYBURN
BY
ATTORNEYS

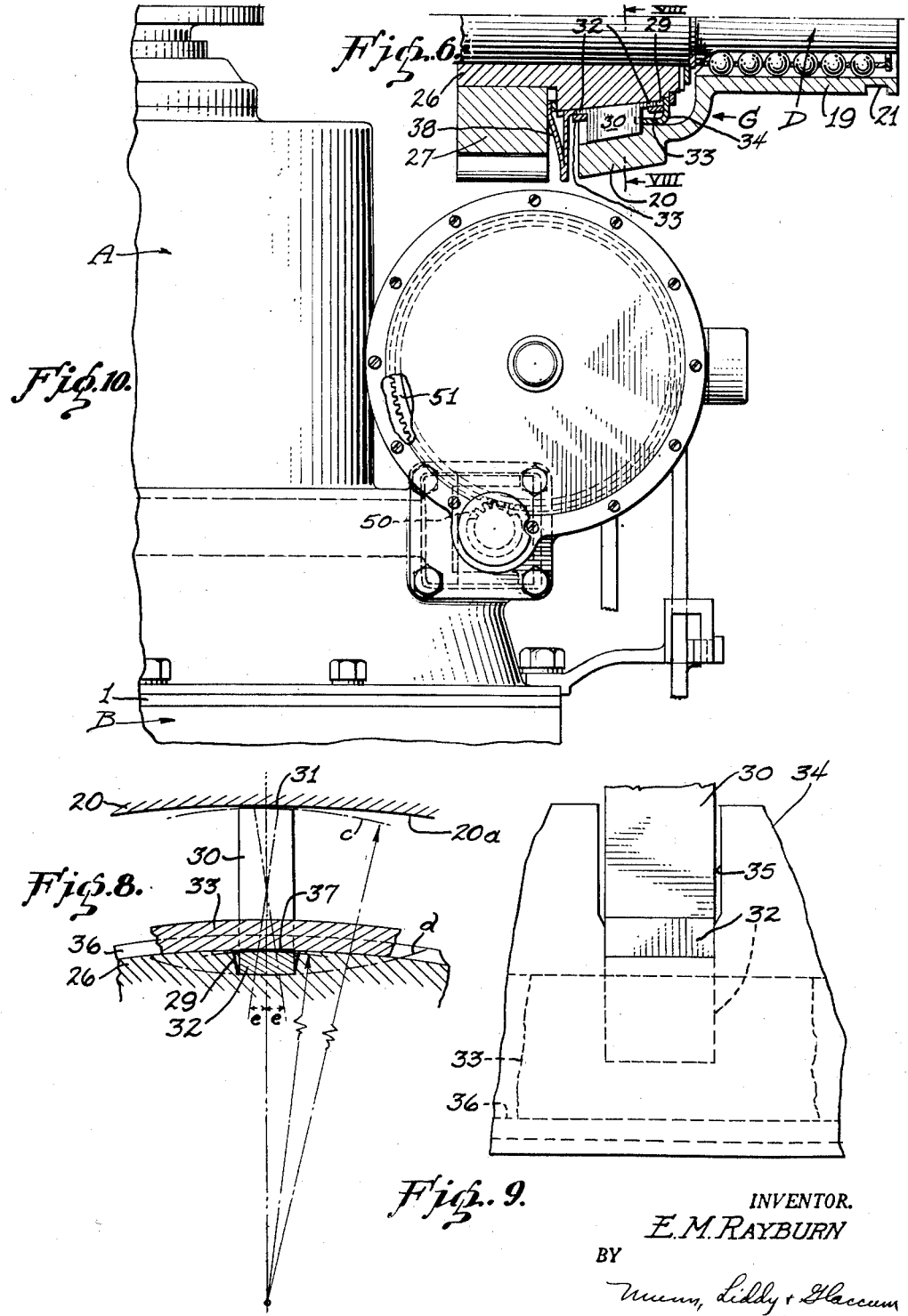

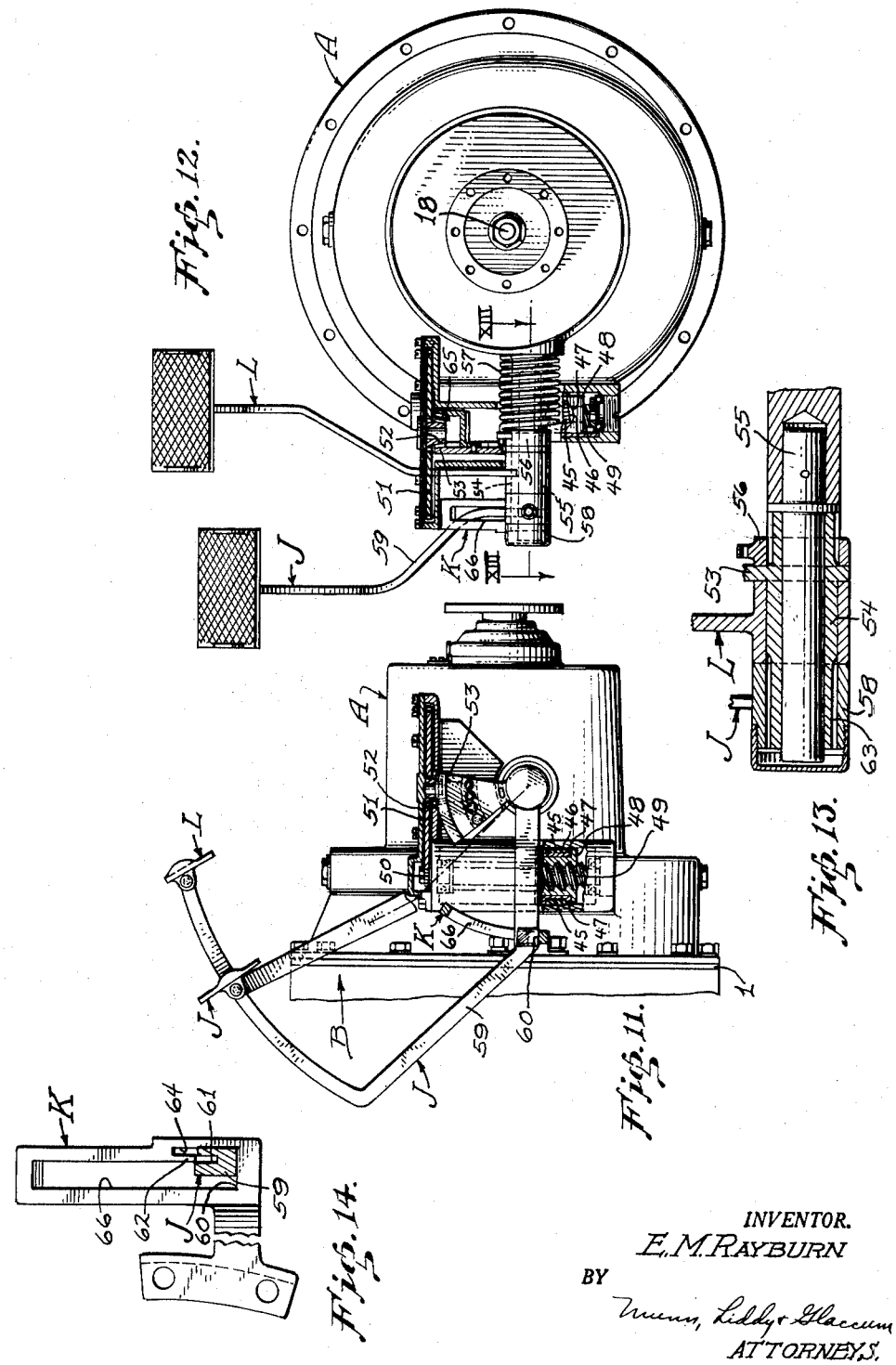

Patented Jan. 8, 1952

2,581,498

UNITED STATES PATENT OFFICE 2,581,498

VARIABLE-SPEED TRANSMISSION

Elwyn M. Rayburn, Sausalito, Calif.

Application June 11, 1946, Serial No. 675,885

12 Claims. (Cl. 74—679)

An object of my invention is to provide a variable speed transmission in which an infinite number of forward speeds is possible within the limits of the device, these speeds being controlled by the mere gradual releasing of a spring-pressed foot pedal from a depressed, neutral position to a position where the foot may be freed from the pedal. A slight lateral shifting of the pedal while in a depressed or "neutral" position, and a gradual releasing of the pedal will provide an infinite number of reverse speeds up to the maximum reverse speed permitted by the device.

A further object of my invention is to provide a transmission of the type described in which the operating parts rotate as a unit within the transmission housing, novel means being provided to utilize certain portions of the throws of a plurality of crank shafts mounted in the transmission to deliver a unidirectional forward or reverse motion to the driven shaft for rotating it at a desired speed either forwardly or in reverse. The propeller shaft of an automobile may be connected to the transmission driven shaft.

Still a further object of my invention is to provide a variable speed transmission that makes use of a rotatable cam plate for actuating the crank shafts, this cam plate being shiftable into eccentric positions with respect to the common axis of rotation of the drive and driven shafts to vary the speed of the driven shaft. I provide a novel connecting means between the cam plate and the member rotated by the engine so that the cam plate will be rotated at a constant speed with the engine regardless of the eccentric position into which the cam plate is shifted.

Still a further object of my invention is to provide a transmission of the type described in which novel means is used for locking the propeller shaft when the engine idles in neutral position, whereby the automobile in which the transmission is mounted will be held from moving down grade should the car be on an incline when the spring-pressed foot pedal is depressed into its "neutral" position.

Other objects and advantages will appear in the following specification, and the novel features of the device will be particularly pointed out in the appended claims.

My invention is illustrated in the accompanying drawings forming a part of this application, in which:

Figure 1 is a longitudinal section through the transmission, portions being shown in elevation;

Figure 2 is a transverse section taken along the line II—II of Figure 1;

Figures 2a, 2b, and 2c, are diagrammatic views of Figure 2, showing the parts of Figure 2 in various positions;

Figure 3 is an enlarged transverse section of the clutch-shifting fork and is taken along the line III—III of Figure 1;

Figure 4 is an enlarged transverse section of the rotary cam plate and is taken along the line IV—IV of Figure 1;

Figure 5 is a schematic sketch illustrating how the cranks are rotated on their own axes while they are rotated about the central axis of the transmission;

Figure 6 is a sectional view of the clutch and is taken along the line VI—VI of Figure 7;

Figure 7 is an enlarged transverse section taken at two different elevations through the automatic crank shaft clutch and is substantially along the line VII—VII of Figure 1;

Figure 8 is a greatly enlarged section of one of the clutch blades and associate parts, and is taken along the line VIII—VIII of Figure 6;

Figure 9 is a still greater enlarged view of one of the clutch blades and associate parts when looking in the direction of the arrows IX—IX of Figure 7;

Figure 10 is an enlarged top plan view of a portion of the transmission casing shown in Figures 1 and 11;

Figure 11 is a side elevation of the device, certain of the gearing being shown in section;

Figure 12 is a rear end view of Figure 11, certain of the gearing being shown in section;

Figure 13 is an enlarged horizontal section of the mounting for the clutch and brake pedals and is taken along the line XIII—XIII of Figure 12; and Figure 14 is a front elevation of the bracket used for guiding the movement of the clutch pedal.

While I have shown only the preferred form of my invention, it should be understood that various changes or modifications may be made within the scope of the appended claims without departing from the spirit and scope of the invention.

In carrying out my invention, I provide a transmission housing indicated generally at A in Figure 1. The housing is secured to the engine casing, a portion of which is shown at B. The transmission housing has an end plate I that rotatably carries a stub-shaft 2 that is splined to a coupling member 3, and this member is connected to the engine crank shaft, not shown. The stub shaft 2 as it is rotated by the engine, not shown, rotates a spider 4. The spider in turn carries a pair of diametrically opposed trunnions 5 on which coupling members 6 are rotatably mounted.

Figure 2 clearly shows each coupling member as having an integral segmental gear portion 7, and the two gear portions mesh with each other. At the free end of each coupling member 6, a pin 8 is carried and Figure 4 illustrates one of the pins as rotatably supporting a cam wheel 9 that rides in a radial slot 10 of a rotatable cam plate C. The plate C has two slots 10 that are aligned with each other and both receive a cam wheel 9 although only one is indicated. The coupling members 6 connect the spider to the cam plate so that the latter will be rotated by the former.

The spider 4 has a central portion 11, see Figure 2, that extends along opposite sides of the meshing gears 7, and this portion has a hub 12 whose axis is aligned with the stub-shaft axis. The hub receives the axle 13 of a crank shaft carrying discs 14 and the axle is splined to the hub so as to be rotated thereby. There are four crank shafts D although I do not wish to be confined to any particular number. The hub projects through a large central opening 15 in the rotatable cam plate C and the opening is large enough to permit a lateral shifting of the cam plate while the plate is rotated by its connection with the spider through the connecting members 6. The lateral shifting of the cam plate produces the variable speed changes as will be presently described.

Figures 2a, 2b, and 2c, illustrate how the meshing gear sections 7 of the connecting members 6 are swung with respect to each other when the center of the cam plate is shifted into an eccentric position with respect to the axis of the spider 4. Figure 4 shows the transmission housing A as being considerably larger in diameter than the cam plate C at the point where the cam plate is housed. The cam plate is rotatably mounted in a shiftable ring E. The ring is of a larger diameter than the cam plate periphery and sliding shoes 16 or other anti-friction means are carried by the cam plate periphery and slide in the ring E. The means for shifting the ring E will be hereinafter described.

Figures 1 and 4 show the transmission in extreme reverse position with the center line of the cam plate C and ring E disposed below the center line of the spider 4 and the engine crank shaft. Figure 2a shows the spider and connecting members 6 rotated clockwise through 45° from the position shown in Figure 2. The rotational center of the spider is indicated at a in Figure 2a and the rotational center of the cam plate C is shown at b in the same figure. The cam plate can be shifted laterally so that its center will be below or above the spider axis a or at any desired intermediate point therebetween.

In Figure 2a, the trunnions 5 have been swung through 45° by the spider and the connecting members 6 have moved their pins 8 into the position shown so that the radial slots 10 will parallel the broken line that extends between the axes of the two pins. The gears 7 permit the connecting members to swing in the manner shown and to rotate the eccentric cam plate C in unison with the spider 4 even though the plate C rotates about the eccentric center b.

Figures 2b and 2c show the relative positions of the trunnions 5 with respect to the spider axis a and the pins 8 with respect to the cam plate axis b when the spider has been rotated 90° and 135° respectively from the position shown in Figure 2. The gears 7 of the connecting members will mesh with each other and will swing for causing the cam plate to rotate at a constant speed with the spider. The connecting members 6 will again assume the position of Figure 2 when the spider and cam plate have been rotated through 180°. In like manner, Figure 2a also illustrates the position of the parts when an arc of 225° has been completed, Figure 2b illustrates the 270° position and Figure 2c the 315° position. After one complete rotation of 360°, the parts will again be in the position of Figure 2.

It is best now to describe the construction and mounting of the four crank shafts D and the individual automatic clutches G, one being associated with each crank shaft. The crank shaft carrying the spider frame 14 is rotated by the spider 4 and the frame forms one end of a crank shaft carrying cage H. The other end of the cage has an end member 17 that is rotatably mounted on a driven transmission shaft 18. The shaft 18 has its front end rotatably mounted in the axle 13 and the rear end is rotatably mounted in the rear end of the transmission housing A.

The crank shafts D have their rear ends splined to the sleeve 19 of the outer clutch member 20 of the cone clutch G. Ball bearings are mounted in the splines to permit a free longitudinal movement of the sleeve on the shaft. The sleeve 19 in turn is rotatably mounted in the end member 17 and is provided with a collar 21 in which a forked finger 22 of a cam follower 23 is slidably received. Figures 1 and 3 illustrate the forked finger 22 being received in the collar. The cam follower slides on a pin 24 carried by the end member 17 and the end 23a is slidably received in a cam groove 25 formed in a stationary member that is secured to the transmission housing. The shape of the cam groove is such that the clutch member 20 for each crank shaft will be moved into clutching engagement with another clutch member 26 mounted on the crank shaft during a portion of the rotation of the crank around the shaft 18.

The clutch G is shown in detail in Figures 1, 7, 8 and 9. The inner cone clutch member 26 is rotatably mounted on the crank shaft D and has a pinion 27 keyed thereto. The pinion is in continuous mesh with a central pinion 28 that forms a part of the shaft 18. Figure 7 shows the inner clutch member 26 provided with a plurality of longitudinally extending and circumferentially spaced blade receiving grooves 29. The upper half of Figure 7 shows the grooves and Figure 8 illustrates one of the grooves and it will be seen that the side walls are flared outwardly to permit the blade 30 received therein to swing slightly, the blade using the bottom of the groove as a fulcrum point.

Each blade is rectangular in cross section and has its outer edge 31 spaced slightly from the inner surface 20a of the outer clutch member 20, see Figure 8. Each blade has a projection 32 at each end and snap rings 33 enclose the projections for holding the blades in position while still permitting them to rock slightly when engaged by the outer cone 20. A blade centering ring 34 is cup-shaped in cross section and is secured to the reduced end portion of the inner cone 26. A side elevation of the ring 34 on a greatly enlarged scale is shown in Figure 9, and the ring has slots 35 in its rim for receiving the blades 30 for the purpose of centering them when the clutch is out. The lower snap ring 33 is received in the cup-shaped ring 34.

Since the pinions 27 will always be in mesh with the central pinion 28, any rotation imparted to the central pinion by one of the pinions 27 in a manner hereinafter described, will also rotate the other pinions 27 and therefore their inner cone clutch members 26 will be rotated. The outer clutch member 20 will be rotated by its crank shaft as will presently be described and therefore both clutch members will be rotating practically in unison and in the same direction when the cam follower 23 reaches the rise 25a in the cam groove, see Figure 1, and causes the clutch member 20 to move longitudinally along the crank shaft to cause the member to frictionally engage the blades 30.

The outer clutch member 20 will be rotating slightly faster than the inner clutch member 26 and therefore the outer member will tend to rock the blades about their inner edges as fulcrums. The blades are rectangular in cross section and this rocking action will cause diagonally opposed corners of the blades, see Figure 8, to bind against the two clutch members and lock them together. To prevent too sudden a locking of the parts together, the longitudinal edges of the blades will be slightly rounded as shown by the curves c and d in Figure 8. The snap rings 33 are received in grooves 36 in the clutch members 26 and the end projections 32 on the blades have their surfaces 37 curved that underlie the snap rings in order that the blades can fulcrum on their inner edges. The transverse axis of the blade will have a swing as indicated by the arrows c in Figure 8, although the actual swing will take place along the inner blade edge and not at the blade center. The radius for the arc c and that for the arc that coincides with the curved projection surface 37 is less than that which will reach to the axis of the crank shaft D because there is a slight freedom of lateral swinging movement for the blades before they will bind the two clutch members together.

Figure 7 illustrates in its lower half, the disc spring 38 that is carried by the pinion 27. The spring has radially extending V-shaped fingers whose ends yieldingly contact the ends of the blades 30 so as to urge these blades toward the cup-shaped blade-centering ring as soon as the outer clutch 20 frees the inner clutch 26. There is one spring finger for each blade. All four clutches G are constructed in the same manner.

The crank shafts D are oscillated as they travel around the shaft 18. Figure 4 shows the cam plate C provided with four slightly S-shaped grooves 39 in which the crank shafts have their wheels 40 slidably mounted. Figure 1 shows how the wheels 40 are rotatably mounted on the arms 41 of the crank shafts D. In Figure 5, I illustrate diagrammatically how each crank shaft is oscillated as it is carried around the shaft 18 through an arc of 180°. The spider axis $a$ is indicated and since the transmission is in reverse position, the cam plate axis is indicated below the spider axis as at $b$. The spider axis $a$ coincides with the driven transmission shaft 18 axis and the circle $f$ indicates the path taken by one of the cranks D during 180° of travel around the shaft 18. The wheel 40 on the crank arm 41 will follow the S-groove 39 as the latter is carried around the different center $b$ of the cam plate C.

Starting with the left hand position of the crank in Figure 5, it will be seen that the arm 41 extends downwardly and to the left from the crank center. A movement of the plate C and the crank shaft D through an arc of 45°, both rotating about their centers $b$ and $a$, respectively, will cause the crank arm 41 to extend to the left of the crank axis and be positioned slightly above. At the 90° position from the starting point, the S-groove 39 is in alignment with a vertical plane that extends through the crank axis and therefore the crank arm 41 will point upwardly in this position.

The next two positions indicate the crank arm being swung to the right so that for the 180° travel of the crank shaft 18 about axis $a$, the crank arm will rotate the crank through a great deal more than 180°. During the remainder of the revolution of the cam plate C, the crank arm 41 will reverse its swing and will return to its original position as indicated at the left hand side of Figure 5. The rotation of the crank shaft in a clockwise direction about its own axis as it is carried around the axis of the shaft 18 through an arc of 180°, will rotate the central pinion 28 in a counterclockwise direction because during the greater portion of this movement the clutch G associated with the crank shaft will connect the shaft to the pinion 27.

During the return movement of the crank shown in Figure 5, i. e., during the second 180° or lower half swing, the clutch is disengaged so the crank will impart no movement to the shaft 18. However, the next crank shaft will become active through its clutch and will continue to rotate the shaft 18 in a counterclockwise direction at a faster speed than the crank shaft is carried in a clockwise direction. All four crank shafts will successively take their turns and the shaft 18 will rotate its propeller shaft, not shown, to which it is connected for causing the automobile to move in reverse, since the propeller shaft will be rotating at a faster speed in a counterclockwise direction than the cage H is rotating in a clockwise direction. The speed of the reverse can be controlled by positioning the axis $b$ of the cam plate C farther away or closer to the axis $a$ shown in Figure 5.

The means for shifting the cam plate laterally is shown in Figures 4 and 10 to 14, inclusive. The shiftable ring E has rack teeth 42 formed in a peripheral portion thereof. The housing A carries a fixed straight rack 43 that meshes with the curved rack 42. The ring E has a radially extending arm 44, see Figure 4, that connects with the ring at a diametrically opposed point from the rack 42. The arm 44 has a forked end 45, see Figure 12, each tine of the fork being slidably receivable in diametrically extending slots 46 provided in discs 47.

Figure 11 illustrates the discs 47 as being rockably carried by a ring shifting block 48. The block has a central threaded bore for receiving a vertically disposed screw 49. The screw is journalled in bearings and the top of the screw carries a small pinion 50, see Figure 10. The pinion meshes with a large gear 51 and Figure 12 illustrates the large gear as having a small bevel gear 52 mounted on the same shaft so as to rotate therewith. A quadrant 53 is shown in mesh with the bevel pinion 52 in Figure 12, and Figure 13 illustrates the quadrant as being carried by a sleeve 54 which in turn is rotatably mounted on a stationary stub-shaft 55. A collar 56 is splined to the sleeve 54 and a torsional spring 57, see Figure 12, tends to rotate the sleeve 54 and the quadrant 53.

A speed control pedal J is connected to a cap 58 which in turn is splined at 63 to the sleeve 54. Figures 11 and 12 show the pedal in its lowered or "neutral" position and the spring 57 will return the pedal to normal position as soon as the pedal is freed. A pedal shank guide frame K is illustrated in Figure 14. The shank 59 of the pedal rests on the lower edge 60 of the frame when the pedal is depressed into its neutral position. When the shank is in this position, the pedal may be shifted laterally to the right in Figure 14, to align a slot 61 in the shank with a guide finger 62 carried by the frame K.

The pedal shank 59 shown in neutral position and shifted to the right in Figure 14, is ready to be raised by the spring 57 into the reverse guide slot 64 in the frame K. As the driver slowly raises his foot, the pedal J will raise and will rotate the quadrant 53 for rotating the gears 52 and 51 and the screw 49. The screw will lower the block 48 to cause the arm 44 to lower the ring E and cam plate C into the position shown for reverse operation of the transmission. As the center of the cam plate is moved downwardly away from the center of the spider, the throw of the crank shafts D will become greater and while they are engaged with the shaft 18 by means of their clutches G, the shaft will be rotated at a greater speed in a counterclockwise or reverse direction than will the cage H be rotated in a clockwise direction. The finger 62 limits the final reverse speed position.

The driver in shifting from reverse to forward speed depresses the pedal J to neutral, shifts the pedal to the left in Figure 14, and this will shift the sleeve 54 for causing the quadrant 53 to become disengaged from the gear 52 and a second quadrant 65 to mesh with the bevel gear, see Figure 12. This will reverse the rotation of the gear 52 as the pedal is permitted to rise in the forward speed slot 66 in the frame K shown in Figure 14. The screw 48 will therefore be rotated in the same direction and will continue to raise the ring E and cam plate C so that their axes will coincide.

The crank shafts D will not be rocked for imparting a clockwise rotation to the shaft 18 and the propeller shaft. As the pedal shank 59 rises to the top of the forward frame slot 66, the center of the cam shaft will be raised to a position where there will be an overdrive, i. e., the shaft 18 will be rotated at a higher speed than the spider.

The brake pedal L is rockably mounted on the sleeve 54 as a support, but does not rotate the sleeve. The brake pedal is connected to the brake mechanism, not shown, of the car in the usual manner.

In overdrive position, the center line b of the plate C is raised to a position above the center line a of the drive shaft. The action is such that the plate will turn with constant velocity while being moved to any position between the extreme limits of its direct drive and overdrive positions. The reaction of the crank pinions against the pinion 28 is such that the crank shafts tend to rotate the plate in a clockwise direction, thus helping the engine torque in the overdrive position.

When the sum of the distances on the pitch line of all four gears equals the circumference of the pinion 28 on its pitch line, the parts are in neutral position. In overdrive position, the crank action will be such that the sum of the distances moved by the four gears on their pitch line will be added to one revolution of the pinion giving a distance 1.33⅓ above the circumference of the pinion 28. There is an ever increasing torque as the speed is decreased and it is proportioned to the lag in the rotation of the pinion 28 to the rotation of the spider.

In summarizing, the following speeds are briefly outlined:

*Reverse.*—The sum of the distances along the pitch line moved by all four crank shaft gears around their axes clockwise is greater than the distance around the pitch line of the pinion 28, thereby causing a reverse rotation of the pinion;

*Neutral.*—The sum of the distances moved by all four gears on their pitch lines equals the pitch line circumference of the gear 28;

*High.*—The sum of the distances moved by all four gears on their pitch lines equals zero and they will cause the pinion 28 to rotate at the same speed as the engine shaft; and

*Overdrive.*—The sum of the distances moved by all four gears is added to the pinion 28 causing the latter to rotate at a faster speed and in the same direction as the engine shaft.

I claim:

1. A variable speed transmission comprising a rotating driving member, a rotatable driven cam disc having an axis paralleling the driving member axis, means for shifting the axis of the disc transversely along a diametrically extending line that intersects the driving member axis, means interconnecting the member and disc so that the latter will be rotated at the same speed as the driving member regardless of the position of the disc axis along the said line, the disc having substantially radially extending cam grooves, a cage rotatable about an axis coinciding with the driving member axis, a plurality of crank shafts equal in number to the cam grooves and rotatably carried by the cage and arranged around the cage axis, arms carried by the cranks and having rollers received in the cam grooves, a driven shaft having its axis coinciding with the cage axis and having an integral gear, said crank shafts having gears rotatably mounted thereon and constantly in mesh with the driven gear, and automatic clutching means for successively connecting each of said last-named gears with its crank shaft during a portion of rotation of the crank shaft about the driven shaft, the crank arms and their crank shafts being oscillated about the crank shaft axes by the rollers riding in the cam grooves when the center of the cam disc is eccentric to the driving member axis, the clutching means connecting the crank shafts to the second-named gears during portions of the oscillations, whereby the gears will rotate the driven shaft gear in one direction for rotating the driven shaft, said disc shifting means including a ring for rotatably supporting the disc, said ring having an arcuate section of teeth, a fixed straight rack, and means for rocking the ring for advancing the ring teeth along the straight rack for shifting the cam disc laterally.

2. In a variable speed transmission, a driving rotatable member, a driven rotatable cam disc having an axis paralleling the axis of the driving member, a ring for rotatably supporting the disc, means for moving the ring so that the disc axis will move in a straight line that intersects the member axis, and means interconnecting the member with the disc for causing the latter to rotate at the same speed as the former regardless of the eccentric position of the disc axis with respect to the member axis, said interconnecting means including two gear quadrants pivotally carried by the member and rotatable about axes that are placed on opposite sides of the member axis and intersect a straight line passing through the member axis, the pivotal axes of the quadrants being spaced equal distances from the member axis and paralleling it, said quadrants being of the same size and meshing with each other, rollers carried by the quadrants at points equally spaced beyond the rotational points of the quadrants, said disc having radially extending grooves for slidably receiving the rollers, whereby a rotation of the member will rotate the disc.

3. In a variable speed transmission, a driving rotatable member, a driven rotatable cam disc having an axis paralleling the axis of the driving member, a ring for rotatably supporting the disc, means for moving the ring so that the disc axis will move in a straight line that intersects the member axis, and means interconnecting the member with the disc for causing the latter to rotate at the same speed as the former regardless of the eccentric position of the disc axis with respect to the member axis, said interconnecting means including two gear quadrants pivotally carried by the member and rotatable about axes that are placed on opposite sides of the member axis and intersect a straight line passing through the member axis, the pivotal axes of the quadrants being spaced equal distances from the member axis and paralleling it, said quadrants being of the same size and meshing with each other, rollers carried by the quadrants at points equally spaced beyond the rotational points of the quadrants, said disc having radially extending grooves for slidably receiving the rollers, whereby a rotation of the member will rotate the disc, a cage rotatable about an axis that coincides with the member axis, a plurality of crank shafts rotatably carried by the cage and being equally spaced from the cage axis and from each other, said disc having cam-shaped grooves, and said crank shafts having arms with rollers slidably received in the cam grooves.

4. In a variable speed transmission, a rotatable cam disc, a ring for rotatably supporting the disc, means for shifting the disc axis along a straight line that extends at right angles to the axis and intersects it, said means comprising an arcuate row of teeth on the ring whose center is the disc axis, a stationary straight rack having teeth adapted to be meshed by the arcuate row of teeth as the ring is moved, the rack causing the disc axis to move along the above-mentioned straight line, said ring having an integral arm disposed opposite to the arcuate teeth, and means for swinging the arm for moving the arcuate teeth over the rack and including means for holding the arm in adjusted position.

5. In a variable speed transmission, a rotatable cam disc, a ring for rotatably supporting the disc, means for shifting the disc axis along a straight line that extends at right angles to the axis and intersects it, said means comprising an arcuate row of teeth on the ring whose center is the disc axis, a stationary straight rack having teeth adapted to be meshed by the arcuate row of teeth as the ring is moved, the rack causing the disc axis to move along the above-mentioned straight line, said ring having an integral arm disposed opposite to the arcuate teeth, and means for swinging the arm for moving the arcuate teeth over the rack and including means for holding the arm in adjusted position, said arm swinging means including a screw-receiving block having guides for slidably receiving the arms, a screw for shifting the block to swing the arm, a foot pedal, a quadrant moved by the pedal, gearing between the quadrant and the screw for rotating the latter when the pedal is manually depressed for moving the disc axis along the straight line, a stop for limiting the depressing movement of the pedal, and spring means for returning the pedal when it is released.

6. In a variable speed transmission, a rotatable cam disc, a ring for rotatably supporting the disc, means for shifting the disc axis along a straight line that extends at right angles to the axis and intersects it, said means comprising an arcuate row of teeth on the ring whose center is the disc axis, a stationary straight rack having teeth adapted to be meshed by the arcuate row of teeth as the ring is moved, the rack causing the disc axis to move along the above-mentioned straight line, said ring having an integral arm disposed opposite to the arcuate teeth, means for swinging the arm for moving the arcuate teeth over the rack and including means for holding the arm in adjusted position, said arm swinging means including a screw-receiving block having guides for slidably receiving the arms, a screw for shifting the block to swing the arm, a foot pedal, a quadrant moved by the pedal, gearing between the quadrant and the screw for rotating the latter when the pedal is manually depressed for moving the disc axis along the straight line, a stop for limiting the depressing movement of the pedal, and spring means for returning the pedal when it is released, said stop permitting a lateral shifting of the pedal when the pedal bears against the stop, a second quadrant moved into mesh with the gearing when the pedal is shifted for causing the gearing to move the disc in the same direction when the pedal moves on its return movement in its shifted position, the shifting of the pedal disconnecting the first quadrant from the gearing.

7. A variable speed transmission comprising a rotating driving member, a rotatable driven cam disc having an axis paralleling the driving member axis, means for shifting the axis of the disc transversely along a diametrically extending line that intersects the driving member axis, means interconnecting the member and disc so that the latter will be rotated at the same speed as the driving member regardless of the position of the disc axis along the said line, a cage rotatable about an axis coinciding with the driving member axis, a plurality of crank shafts rotatably carried by the cage and arranged around the cage axis, a driven shaft having its axis coinciding with the cage axis and having an integral gear, said crank shafts having gears rotatably mounted thereon and constantly in mesh with the driven gear, automatic clutching means for successively connecting each of said last-named gears with its crank shaft during a portion of rotation of the crank shaft about the driven shaft, means interconnecting the cam disc with the crank shafts to oscillate the latter when the center of the cam disc is eccentric to the driving member axis, the clutching means connecting the crank shafts to the second-named gears during portions of the oscillations, whereby the gears will rotate the driven shaft gear in one direction for rotating the driven shaft, said disc shifting means including a ring for rotatably supporting the disc, said ring having an arcuate section of teeth, a fixed straight rack, and means for rocking the ring for advancing the ring teeth along the straight rock for shifting the cam disc laterally.

8. In a variable speed transmission, a driving rotatable member, a driven rotatable cam disc having an axis paralleling the axis of the driving member, a ring for rotatably supporting the disc, means for moving the ring so that the disc will move in a straight line that intersects the member axis, and means interconnecting the member with the disc for causing the latter to rotate at the same speed as the former regardless of the eccentric position of the disc axis with respect to the member axis, said interconnecting means including two intermeshing gear quadrants pivotally carried by the member and rotatable about axes that are placed on opposite sides of the member axis and intersect a straight line passing through the member axis, and rollers carried by the quadrants and slidably received in radial slots provided in the cam disc for rotating the latter when the quadrants are turned by the driving rotatable member.

9. In a variable speed transmission, a driving rotatable member, a driven rotatable cam disc having an axis paralleling the axis of the driving member, a ring for rotatably supporting the disc, means for moving the ring so that the disc will move in a straight line that intersects the member axis, and means interconnecting the member with the disc for causing the latter to rotate at the same speed as the former regardless of the eccentric position of the disc axis with respect to the member axis, said interconnecting means including two intermeshing gear quadrants pivotally carried by the member and rotatable about axes that are placed on opposite sides of the member axis and intersect a straight line passing through the member axis, rollers carried by the quadrants and slidably received in radial slots provided in the cam disc for rotating the latter when the quadrants are turned by the driving rotatable member, a cage rotatable about an axis that coincides with the member axis, and a plurality of crank shafts rotatably carried by the cage, said disc having cam-shaped grooves, and said crank shafts having arms slidably received in the cam grooves.

10. In a variable speed transmission, a rotatable cam disc, a ring for rotatably supporting the disc, means for shifting the disc axis along a straight line that extends at right angles to the axis and intersects it, said means comprising an arcuate row of teeth on the ring whose center is the disc axis, a stationary straight rack having teeth adapted to be meshed by the arcuate row of teeth as the ring is moved, the rack causing the disc axis to move along the above-mentioned straight line, means for moving the ring to advance its teeth over the rack teeth while maintaining the teeth of the ring and rack in mesh, and means for holding the ring in adjusted position.

11. In a variable speed transmission, a rotatable cam disc, a ring for rotatably supporting the disc, means for shifting the disc axis along a straight line that extends at right angles to the axis and intersects it, said means comprising an arcuate row of teeth on the ring whose center is the disc axis, a stationary straight rack having teeth adapted to be meshed by the arcuate row of teeth as the ring is moved, the rack causing the disc axis to move along the above-mentioned straight line, means for moving the ring to advance its teeth over the rack teeth while maintaining the teeth of the ring and rack in mesh, and means for holding the ring in adjusted position; said ring-moving and holding means including a screw-receiving block, a screw for shifting the block, a pedal, a quadrant moved by the pedal, gearing between the quadrant and the screw for rotating the latter when the pedal is depressed for moving the disc axis along the straight line, a stop for limiting the depressing movement of the pedal, and spring means for returning the pedal when it is released.

12. In a variable speed transmission, a rotatable cam disc, a ring for rotatably supporting the disc, means for shifting the disc axis along a straight line that extends at right angles to the axis and intersects it, said means comprising an arcuate row of teeth on the ring whose center is the disc axis, a stationary straight rack having teeth adapted to be meshed by the arcuate row of teeth as the ring is moved, the rack causing the disc axis to move along the above-mentioned straight line, means for moving the ring to advance its teeth over the rack teeth while maintaining the teeth of the ring and rack in mesh, and means for holding the ring in adjusted position; said ring-moving and holding means including a screw-receiving block, a screw for shifting the block, a pedal, a quadrant moved by the pedal, gearing between the quadrant and the screw for rotating the latter when the pedal is depressed for moving the disc axis along the straight line, a stop for limiting the depressing movement of the pedal, and spring means for returning the pedal when it is released, said stop permitting a lateral shifting of the pedal when the pedal bears against the stop, a second quadrant moved into mesh with the gearing when the pedal is shifted for causing the gearing to move the disc in the same direction when the pedal moves on its return movement in its shifted position, the shifting of the pedal disconnecting the first quadrant from the gearing.

ELWYN M. RAYBURN.

REFERENCES CITED

The following references are of record in the file of this patent:

UNITED STATES PATENTS

| Number | Name | Date |
|---|---|---|
| 384,286 | Schmid | June 12, 1888 |
| 562,498 | Sperry | June 23, 1896 |
| 725,716 | James | Apr. 21, 1903 |
| 1,298,881 | Buchli | Apr. 1, 1919 |
| 1,731,285 | Anglada | Oct. 15, 1929 |
| 2,143,120 | Cavallo | Jan. 10, 1939 |
| 2,178,784 | Ewart | Nov. 7, 1939 |

FOREIGN PATENTS

| Number | Country | Date |
|---|---|---|
| 97,818 | Australia | Sept. 10, 1924 |
| 128,654 | Germany | Mar. 1, 1902 |
| 847,655 | France | Oct. 13, 1939 |